UNITED STATES PATENT OFFICE.

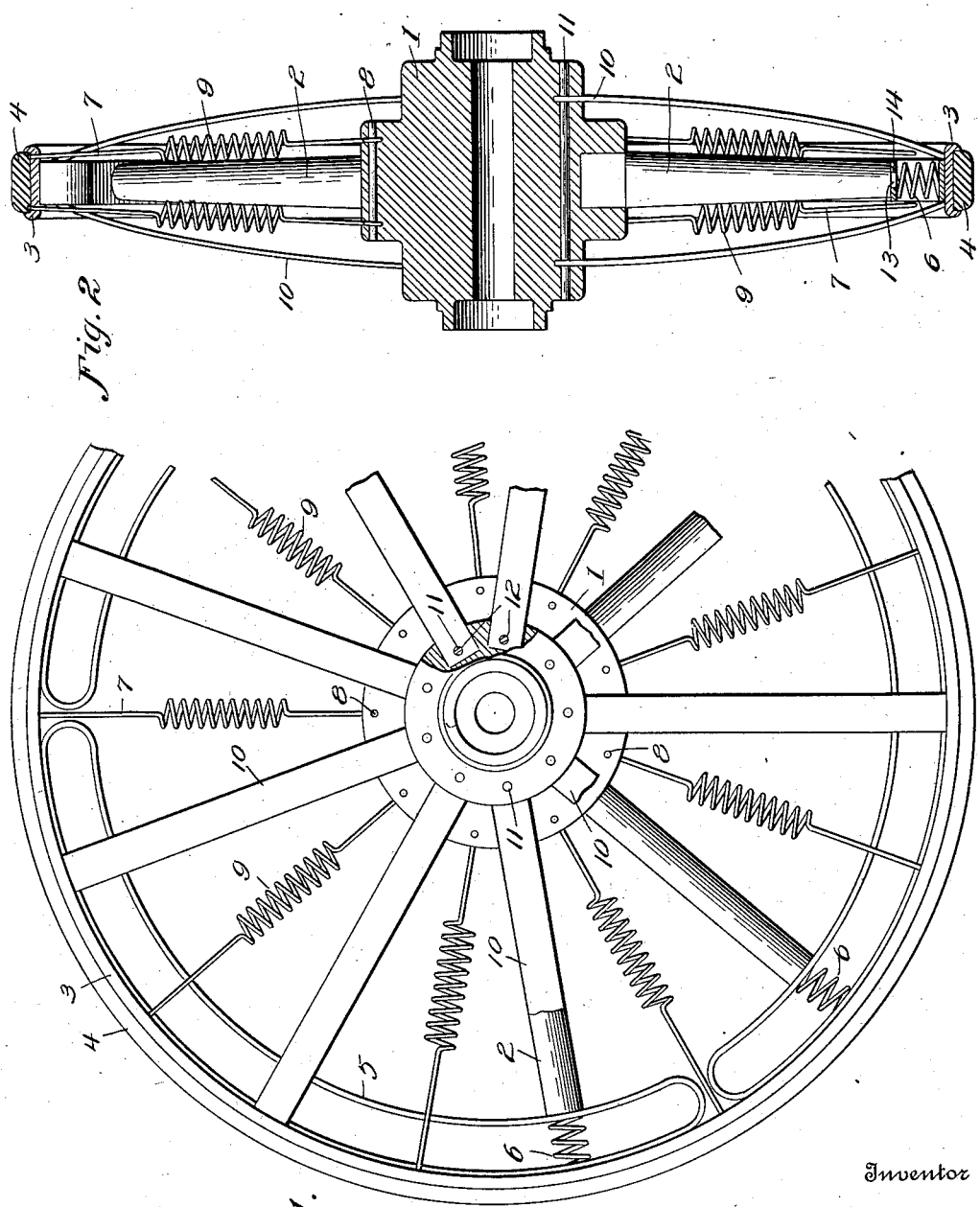

GEORGE H. METCALF, OF WILKINSON, MISSISSIPPI, ASSIGNOR OF ONE-HALF TO J. A. NUNNERY, OF ROSETTA, MISSISSIPPI.

WHEEL.

1,021,618.

Specification of Letters Patent.　　Patented Mar. 26, 1912.

Application filed April 20, 1911.　Serial No. 622,240.

*To all whom it may concern:*

Be it known that I, GEORGE H. METCALF, a citizen of the United States, residing at Wilkinson, in the county of Wilkinson and State of Mississippi, have invented new and useful Improvements in Wheels, of which the following is a specification.

This invention relates to wheels and more particularly to spring wheels, the object of the invention being to provide a novel arrangement of parts whereby the felly may be movable relative to the hub and whereby suitable springs are interposed between the hub and felly to take up the shocks received by the latter.

Further objects of the invention will appear as the following specific description is read in connection with the accompanying drawings, which form a part of this application, and in which:—

Figure 1 is a detail side elevation. Fig. 2 is a vertical section therethrough.

Referring more particularly to the drawings, 1 represents the hub which has projecting therefrom a series of spokes 2.

The felly is indicated at 3 and is provided with the usual cushion tire 4. Secured to the felly and arranged between the same and the ends of the spokes 2 are a plurality of springs 5 in the form of endless bands which have parallel sides, interposed between which are spiral springs 6 arranged immediately beneath the end of each spoke. Intermediate each spoke and arranged upon opposite sides of the spokes are connectors 7 which pass through the felly or rim and are headed or otherwise secured thereto and have their inner ends formed with loops which extend into the hub and are engaged by transverse pins 8. The intermediate portion of these connectors is formed into a spiral spring 9 which is expansible so that, as the hub is depressed, the springs upon the upper side of the wheel will be expanded, while the springs upon the lower side of the wheel will be operated so that they will extend somewhat out of normal alinement.

Extending into recesses formed in the periphery of the hub and arranged at intervals around the hub at opposite sides thereof are a plurality of bowed springs 10 whose outer ends are engaged beneath the felly or rim and rest against the outer edges of the springs 5. The inner or socket ends of these springs are held in position by transverse pins 11 which extend through the hub and through eyes 12 in the ends of the springs. The springs 9 have to be pulled upon to increase their tension, while the springs 10 have to be depressed to increase their tension as also do the springs 5 and 6, and the spokes are only connected to the felly by having projections 13 formed on their ends which enter apertures 14 in the inner side of the springs 5. The springs 10 are maintained in their position by their inherent resiliency, they being sprung into engagement with the felly and are never so extended as to disconnect themselves. No means has been shown for retaining the springs 6 or the spokes in engagement with the band springs 5 and any means may be provided for this purpose.

Having thus described the invention, what I claim as new is:—

A wheel comprising a hub, spokes radiating therefrom, a felly, a plurality of endless band springs arranged between the felly and the spokes and having parallel sides, springs arranged between the sides of said endless band springs and in line with the spokes, leaf springs carried by the hub and loosely engaging the felly, and connectors secured to the hub and felly outside of the band spring and having interposed spiral spring portions.

In testimony whereof I affix my signature in presence of two witnesses.

his
　　GEORGE H. × METCALF.
　　　　　　　　　mark

Witnesses:
　G. H. BARNEY,
　J. A. NUNNERY.